United States Patent [19]

Pedain et al.

[11] Patent Number: 4,935,485
[45] Date of Patent: Jun. 19, 1990

[54] HEAT HARDENABLE COATING COMPOSITION BASED ON POLYURETHANE UREA AND COATED SUBSTRATE PREPARED THEREFROM

[75] Inventors: Josef Pedain, Cologne; Wilhelm Thoma; Walter Schröer, both of Leverkusen; Waldemar Kling, Kuerten-Bechen, all of Fed. Rep. of Germany

[73] Assignee: Bayer Aktiengesellschaft, Bayerwerk, Fed. Rep. of Germany

[21] Appl. No.: 292,695

[22] Filed: Jan. 3, 1989

[30] Foreign Application Priority Data

Jan. 9, 1988 [DE] Fed. Rep. of Germany ....... 3800434

[51] Int. Cl.$^5$ .............................................. C08G 18/80
[52] U.S. Cl. ..................................................... 528/45
[58] Field of Search .......................................... 528/45

[56] References Cited

U.S. PATENT DOCUMENTS

| | | | |
|---|---|---|---|
| 3,634,544 | 1/1972 | Takeda et al. | 260/858 |
| 3,687,715 | 8/1972 | Klgane et al. | 117/76 R |
| 4,248,756 | 2/1981 | Konig et al. | 260/31.2 |
| 4,363,686 | 12/1982 | Komarek | 156/242 |
| 4,367,327 | 1/1983 | Holker et al. | 528/61 |
| 4,409,340 | 10/1983 | Stolzenbach et al. | 521/159 |

FOREIGN PATENT DOCUMENTS

| | | |
|---|---|---|
| 1220384 | 7/1966 | Fed. Rep. of Germany . |
| 1226071 | 10/1966 | Fed. Rep. of Germany . |
| 58-057420 | 4/1983 | Japan . |
| 59-036781 | 2/1984 | Japan . |
| 61-009423 | 1/1986 | Japan . |
| 1288401 | 9/1972 | United Kingdom . |
| 2048289 | 12/1980 | United Kingdom . |

*Primary Examiner*—Maurice J. Welsh
*Attorney, Agent, or Firm*—Joseph C. Gil; Thomas W. Roy

[57] ABSTRACT

The present invention is directed to a heat hardenable coating composition containing (A) a prepolymer containing an average of 2-4 ketoxime-blocked isocyanate groups, having an average molecular weight of about 500 to 15,000 and based on an aromatic polyisocyanate and a polyhydroxyl component which contains about 20-100% by weight of ethylene oxide units and (B) a cross-linking agent corresponding to the following formula

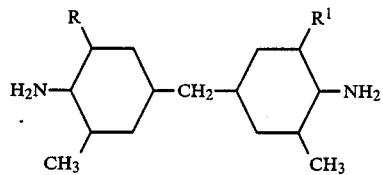

in which R and R$^1$ denote H or C$_1$-C$_4$-alkyl, the equivalent ratio of blocked isocyanate groups in (A) to NH$_2$ groups in (B) being about 1.35:1 to 0.95:1.

The invention is also directed to the coated substrates obtained from the compositions according to the invention.

10 Claims, No Drawings

HEAT HARDENABLE COATING COMPOSITION BASED ON POLYURETHANE UREA AND COATED SUBSTRATE PREPARED THEREFROM

BACKGROUND OF THE INVENTION

1. Field of the Invention

This invention relates to a heat hardenable coating composition based on polyurethane urea, in particular for producing coatings which are permeable to water vapor on substrates and the coated substrates produced therefrom.

2. Description of the Prior Art

Coatings which are permeable to water vapor may be produced by various means. One process which has been known for a long time enables micropores to be produced in a coating by physical means. In these processes a polymer (this is to be understood hereinafter to denote mainly a polyurethane) dissolved in a solvent is applied as a layer to a substrate or a separating support and passed in the wet state through a bath which contains a non-solvent for the polymer which is miscible with the solvent. The non-solvent therefore penetrates the layer of solution where it gradually precipitates and coagulates the solid substance. When the resulting solidified film dries, both the solvent which escapes and the non-solvent leave micro channels behind which are available for the transport of water vapor in the coating.

By the addition of salt powders to polymer solutions it is possible in a similar manner to produce coatings from which the salt may be washed out with water, leaving microcavities behind.

The perforation of non-porous films by means of high energy electron beams also results in films with high water vapor permeability which can be laminated. (In the coating obtained which is permeable to water vapor, the volume of water vapor transported per unit time and surface area is generally 10 times as great as in a conventional non-porous film.)

These processes generally have the disadvantage of being chemically complicated or requiring elaborate apparatus or giving rise to considerable problems of waste.

A variation of the microporous coating process which does not require the complicated immersion bath technology has recently been carried out but has led to substantially the same results. In this process, also known as evaporation coagulation, sufficient water is added to the solution of the polymer in a low boiling solvent to ensure that the resulting spread coating paste is only just still stable and can be applied.

During the drying process the organic solvent is the first to be removed and the increasing proportion of water then precipitates the solid substances as in the immersion process and finally evaporates to leave a microporous structure in the film.

All these processes have the major disadvantage that microchannels or microcavities weaken the permeable coatings. This means that the mechanical strength and abrasion resistance are considerably inferior to those of a non-porous film. Accordingly, it is an object of the present invention to produce coatings which overcome these deficiencies.

There have been many attempts to obtain permeability to water vapor in a coating not only by physical methods but also by chemical means. Attempts have been made to produce such coatings with polyurethanes based on water-soluble or hydrophilic starting components. DE-AS Nos. 1,220,384 and 1,226,071 describe polyurethanes which are prepared from glycols, diisocyanates and a difunctional hydrophilic starting component based on a macrodiol which renders the coating permeable to water vapor. Both of these applications deal with a polyethylene glycol having a molecular weight of about 1000 and differ from one another only in the "vulcanization" mechanism, i.e., the subsequent cross-linking of the polyurethane elastomer.

Compact top coats on composite materials of textile substrates and microporous coatings of the kind described in DE-OS No. 2,020,153 are also permeable to water vapor.

According to the teaching of Japanese Patent Application No. J 61 009 423, polyethylene glycols may be used as diol components for preparing polyester polyols and subsequently polyurethane elastomers to produce coatings which are permeable to water vapor and have a negligible tendency to well in water.

Segmented polyurethane elastomers obtained from polyethylene glycols are also claimed in European Patent Application No. 52,915.

Other organic hydrophilic components are also added to polyurethanes to produce coatings and composite materials which are permeable to water vapor. In particular, poly-ω-methylglutamate may be added to polyurethanes, used as a starting component or grafted onto a polyurethane. DE-OS Nos. 1,922,329 and 1,949,060 and Japanese Patent Application Nos. J 58 057 420 and J 59 036 781 are only a few of the many literature references in which this use is described.

Recently, it is mainly polyurethanes containing the above-mentioned polyethylene glycols as starting components which are of particular technical interest for the field of compact coating compounds permeable to water vapor. These raw materials are inexpensive and widely available. The polyurethanes and polyurethane ureas obtained from them are also known in principle. In contrast to the widely used polyurethane ureas which contain polyesters, polycarbonates or polyethers as macrodiols, the above-mentioned polyurethanes are water-absorbent and permeable to water vapor, and in some cases even swell strongly or dissolve in water.

Hydrophobic polyols are therefore added to the polyethylene glycols which provide the hydrophilic properties. Such mixtures give rise to polyurethanes and polyurethane ureas which have good permeability to water vapor combined with high resistance to the action of liquid water.

Two-component coating systems of ketoxime-blocked prepolymers and cycloaliphatic diamines as cross-linking agents/hardeners prepared with at the most 15% by weight of solvent are claimed in DE-OS No. 2,902,090 (=U.S. Pat. No. 4,248,756). The polyhydroxyl compounds in the blocked prepolymers, for example, polypropylene oxides, may also contain ethylene oxide units.

SUMMARY OF THE INVENTION

The present invention is directed to a heat hardenable coating composition containing (A) a prepolymer containing an average of 2-4 ketoxime-blocked isocyanate groups, having an average molecular weight of about 500 to 15,000 and based on an aromatic polyisocyanate and a polyhydroxyl component which contains about 20-100% by weight of ethylene oxide units and (B) a cross-linking agent corresponding to the following formula

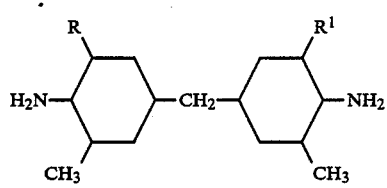

in which R and R$^1$ denote H or C$_1$–C$_4$-alkyl, the equivalent ratio of blocked isocyanate groups in (A) to NH$_2$ groups in (B) being about 1.35:1 to 0.95:1.

The invention is also directed to the coated substrates obtained from the compositions according to the invention.

DETAILED DESCRIPTION OF THE INVENTION

The coating composition may also contain pigments, fillers, solvents and other additives conventionally used in coating compounds.

The coating composition may in particular also contain aliphatic and/or aromatic PUR solutions.

The solids concentration of the coating composition is preferably about 35 to 100% by weight, most preferably about 50–90% by weight.

Aromatic diisocyanates such as those described e.g. in U.S. Pat. Nos. 3,984,607 and 4,035,213 (herein incorporated by reference in their entireties) and in DE-OS No. 2,402,840 and DE-OS No. 2,457,387 may be used for the synthesis of the ketoxime-blocked isocyanate prepolymers (A). 2,4'- and 4,4'-diisocyanatodiphenylmethane, the isomeric toluylene diisocyanates and mixtures of these diisocyanates are preferred.

The reactants used with these diisocyanates for the preparation of the isocyanate prepolymers are polyhydroxyl components containing about 20 to 100% by weight, preferably about 40 to 80% by weight of ethylene oxide (EOX), e.g., polyhydroxyl compounds containing 2–4 hydroxyl groups and having a molecular weight of about 500 to 10,000, preferably about 1000 to 6000, as also described in detail in the above-mentioned publication.

Preferred polyhydroxyl components include polyhydroxypolyethers containing 2 to 3 hydroxyl groups such as propylene oxide polyethers containing EOX units, preferably about 30 to 90% by weight EOX units and more preferably about 40 to 80% by weight EOX units; pure EOX polyethers; mixtures of the above-mentioned polyhydroxypolyethers with polyhydroxypolyesters (such as hydroxypolyesters of adipic acid, hexanediol-(1,6) and neopentyl glycol) having an average molecular weight of about 1000 to 6000, preferably 1000 to 3000 and/or hydroxypolycarbonates of hexanediol, hydroxyethoxyhexanol, hydroxypolycaprolactone and diphenylcarbonate.

The polyether content in the mixtures is preferably about 30 to 99% by weight, most preferably about 40 to 90% by weight.

Low molecular weight diols having a molecular weight below about 300, which are known as chain lengthening agents, may also be included in the preparation of the isocyanate prepolymers. Butane-1,4-diol and hexane-1,6-diol are preferred.

Preparation of the isocyanate prepolymers is carried out in known manner by reacting the abovementioned polyhydroxyl compounds with excess diisocyanate, preferably about 70°–110° C. An NCO/OH ratio of about 1.5:1 to 6.0:1, preferably about 1.7:1 to 2.5:1 is generally employed.

The blocking agents used for the isocyanate prepolymers include ketoximes of hydroxylamine and ketones such as acetone, methyl ethyl ketone, diethyl ketone, cyclohexanone, acetophenone or benzophenone.

Methyl ethyl ketoxime (butanone oxime) is a preferred blocking agent. The blocking reaction is carried out, for example, by reacting the isocyanate prepolymer with preferably stoichiometric quantities of ketoxime at elevated temperatures, for example about 70°–100° C., until the isocyanate groups can no longer be detected.

The cross-linking component (B) used for the blocked isocyanate prepolymers is preferably 4,4'-diamino-3,3'-dimethyl-dicyclohexylmethane, an aliphatic diamine which is liquid at room temperature and has a very low vapor pressure. In the coating compositions according to the invention, the equivalent ratio of blocked isocyanate groups in (A) to NH$_2$ groups in (B) is preferably about 1.25:1 to 1:1.

The compositions according to the invention are used in particular for coating textile sheets and leather. It is particularly advantageous that they can be used to produce coatings which are permeable to water vapor.

The heat hardenable reactive mixtures can be used to produce coatings which are permeable to water vapor in conventional coating installations, both by the direct process and by the reverse coating process. It is possible by these means to produce different types of layers such as bonding layers and interlayers or top coat layers, which differ in their properties according to the particular chemical structure of the isocyanate prepolymer.

A reverse coating may be produced from the products according to the invention by first applying the reactive mixture for the top coat on a temporary support, e.g., a transfer paper, in a quantity of about 30–100 g/m$^2$ and then hardening it in a drying channel; the dried top coat also in a quantity of about 30 to 100 g/m$^2$ laminating the substrate thereto, hardening the coating in a further drying channel at about 120° to 190° C., preferably about 150° to 160° C.; and removing the coated substrate from the support. If desired, of course, only the top coat or the bonding coat may be produced from the coating compounds according to the invention and a conventional coating system may be employed for the other coat.

As previously mentioned, the reactive mixtures may also be applied directly to the textile substrate by the direct coating process.

The coating compositions according to the invention may also be blended with 1- or 2-component PUR in solution or dispersion form. See, e.g., DE-PS No. 2,457,387 and DE-PS No. 3,134,161 (U.S. Pat. No. 4,594,385, herein incorporated by reference). The PUR used for this purpose may be hydrophobic or hydrophilic.

When interlayers are produced from the coating compounds according to the invention, compounds which release gases when heated may be used as blowing agents and foam stabilizers may advantageously also be used. Suitable additives are described, for example, in DE-OS No. 1,794,006 (GB-P No. 1,211,339) and in U.S. Pat. No. 3,262,805.

The advantages of using the coating compositions according to the invention for the preparation of coated substrates which are permeable to water vapor are as follows:

1. High solids content of the spread coating pastes and therefore relatively low solvent content, about 10-50% by weight.
2. Long pot life of the coating pastes, e.g., more than 14 days after the addition of cross-linking agent (B).
3. Coatings containing a large quantity of solid substance per unit surface area, e.g. about 50-150 g/m$^2$ may be obtained.
4. High permeability to water vapor, 2-8 g/cm$^2$ h according to IUP15, combined with high solids content of the coating.
5. High water resistance of the coating after washing and/or dry cleaning.
6. Low abrasion of the compact coating surface.
7. No environmentally polluting precipitation bath liquids such as those resulting from the coagulation of DMF solutions in water.
8. Conventional spread coating, doctor blade coating and drying techniques usable in contrast to the difficult spread coating and drying conditions required for the production of microporous layers which are permeable to water vapor by the process of evaporation coagulation.

The invention is further illustrated but is not intended to be limited by the following examples in which all parts and percentages are by weight unless otherwise specified.

EXAMPLES

EXAMPLE 1

Ketoxime blocked prepolymer (according to the invention)

340 g of a straight chain polyether obtained from 50% by weight of ethylene oxide and 50% by weight of propylene oxide (started on 1,2-propylene glycol) having an OH number of 56 and 340 g of a trifunctional polyether obtained from 27.5% by weight of propylene oxide and 72.5% by weight of ethylene oxide (started on glycerol) having an OH number of 36 and containing 170 g of a homogeneously dispersed polyurea of toluylene diisocyanate (2,4-:2,6-isomer mixture=80:20) and hydrazine hydrate were reacted with 150 g of the same isomeric mixture of toluylene diisocyanate in the melt at 90° C. The resulting isocyanate prepolymer was blocked with 102 g of butanone oxime at 90° C. Isocyanate content: 4.45%, viscosity: 50,000 mPa.s/25° C.

(a) Direct coating 1000 g of the blocked hydrophilic prepolymer described above were mixed with 20 g of finely divided silica (Aerosil 200, Degussa) and 125 g of 4,4'-diamino-3,3'-dimethyl-dicyclohexylmethane. The spread coating paste described above was applied as foundation layer, using a 1 mm floating knife, to a polyamide taffeta which had been pretreated with 15 g/l of a commercial fluoroalkyl sulphonamide.

Temperature of channel: 120°-160° C. In a second passage through the apparatus, the top coat of the same spread coating paste was applied in analogous manner. The total solids content of the substance applied was 30 g/cm$^2$. The article obtained, which was highly permeable to water vapor, had a water resistance of 2000 mm WS.

(b) Transfer coating 1000 g of the blocked, hydrophilic prepolymer described above were diluted with 100 g of a mixture of alkylated aromatic hydrocarbons (Solvesso 100: Esso).

After the addition of 15 g of an ethoxylated dimethyl-polysiloxane as levelling agent, 15 g of finely divided silica (Aerosil 200; Degussa) and 120 g of 4,4'-diamino-3,3'-dicyclohexylmethane were added with thorough mixing, the spread coating paste obtained was ready for use.

This spread coating paste was applied as top coat to an impregnated separating paper, dried and reacted at 120°-160° C. The solids content of the paste applied was 50 g/m$^2$. A laminating coat was applied by coating knife, using an analogously prepared bond coat paste containing 2% of finely divided silica (Aerosil 200; Degussa) and no silicone levelling agent. A CO/PES fabric was then laminated thereto and the substance was dried and cross-linked at 120°-160° C. Total application: 90 g/m$^2$. The permeability to water vapor according to IUP 15 was approximately 3 mg/cm$^2$ h (DIN 5333). The water resistance after dry cleaning 3 times and washing three times was greater than 2000 mm WS.

EXAMPLE 2

Top coat paste 1 (according to the invention)

1000 g of the blocked hydrophilic prepolymer described in Example 1 were mixed with 150 g of a 35% solution of an aromatic one-component polyurethane in DMF /toluene/methyl ethyl ketone. 125 g of 4,4'-diamino-3,3'-dimethyl-dicyclohexylmethane were added for cross-linking the prepolymer. The 92.3% preparation, which had a viscosity of about 35,000 mPa.s/25° C., was pigmented with 100 g of titanium dioxide.

Preparation of the 35% one-component PUR solution: 706 g of a 1,2-propylene glycol polyether having an OH number of 56 were reacted with 240 g of diphenylmethane-4,4'-diisocyanate in 660 g of toluene at 100° C. to produce an isocyanate prepolymer which was then converted to the polyurethane at 80° C. by the addition of 54 g of butanediol-(1,4) in 700 g of DMF and 500 g of methyl ethyl ketone. The 35% solution had a viscosity of about 25,000 mPa.s/25° C.

Top coat paste 2 (according to the invention)

1000 g of the blocked, hydrophilic prepolymer described in Example 1 were mixed with 200 g of a 45% solution of a hydrophilic, aromatic one-component polyurethane in DMF/toluene. 125 g of the cycloaliphatic diamine from Example 1 were added as cross-linking agent for the blocked isocyanate prepolymer.

The 91.7% spread coating paste had a viscosity of about 38,000 mPa.s/25° C.

Preparation of the 45% one-component PUR solution: 1500 g of an adipic acid polyester prepared from a 65:35 mixture of hexanediol-(1,6) and neopentyl glycol, OH number 56, and 1500 g of a polyether of ethylene oxide started on diethylene glycol, OH number 56, were reacted at 70° C. with a mixture of 225 g of butanediol-(1,4) and 500 g of 4,4'-diisocyanatodiphenylmethane in 1820 g of toluene and 2730 g of DMF; viscosity 40,000 mPa.s/25° C.

Transfer coating

The top coat prepared from the coating pastes 1 and 2 (cross-linking temperature 150°–160° C.) were laminated to a CO/PES fabric, using the hydrophilic, 45%, one-component polyurethane solution as bonding coat. The articles, which had a total PUR covering of about 70 g/m$^2$, were found to have a permeability to water vapor of 3.5 mg/cm$^2$ h according to IUP 15.

EXAMPLE 3

Top coat (according to the invention)

1000 g of the polyether described in Example 1 and obtained from 50% by weight of ethylene oxide and 50% by weight of propylene oxide (OH number 56), 800 g of a polyether of 100% ethylene oxide (OH number 56) and 200 g of a propylene glycol polyether of 100% propylene oxide (OH number 56) which contained 200 g of a homogeneously dispersed polyurea (see Example 1) were reacted with 522 g of 2,6-toluylene diisocyanate at 80°–90° C. The isocyanate groups of the prepolymer were then blocked by a reaction with 350 g butanone oxime at 80° C. Isocyanate content: 5.45%; viscosity: 35,000 mPa.s/25° C.

1000 g of this hydrophilic prepolymer were mixed with 154 g of 4,4'-diamino-3,3'-dimethyldicyclohexylmethane and used for the preparation of the top coat.

Bonding coat 1000 g of a polyester carbonate with OH number 6 obtained from hydroxycaproic acid-ω-hydroxyhexylester and diphenylcarbonate and 1000 g of a dihydroxypolyethylene glycol having an OH number of 56 were dehydrated and then reacted with a mixture of 255 g of isophorone diisocyanate and 59 g of hexamethylene diisocyanate at 100° C. to form an isocyanate prepolymer. Reaction time: 90 minutes. After the prepolymer had been dissolved in 1170 g of toluene, a solution of 25 g of hydrazine hydrate in 936 g of i-propanol and 234 g of 1-methoxypropanol-2 was added dropwise at about 25° C. An approximately 50% solution having a viscosity of 40,000 mPa.s/25° C. was obtained after 2 hours' stirring.

The permeability to water vapor according to IUP 15 of the cross-linked film weighing 40 g/m$^2$ was 6 mg/cm$^2$ h.

50 g of a commercial methylol ether melamine resin, 50% in butanol (trade name of the solution Imprafix SV-Lösung; Bayer AG) and 7,5 g of a 20% solution of p-toluene sulphonic acid in isopropanol were added to 1000 g of the solution for the bonding coat.

An article coated with about 70 g/m$^2$ of PUR by the transfer coating process had a permeability to water vapor determined according to IUP 15 of about 4 mg/cm$^2$ h.

EXAMPLE 4

Top coat (according to the invention)

170 g of a straight chained polyether of 50% by weight of ethylene oxide and 50% by weight of propylene oxide (OH number 56) obtained according to Example 1, 85 g of an ethylene glycol polyether (OH number 56), 85 g of a hexanediol/neopentyl glycol polyadipate (OH number 56) obtained according to Example 2 and 340 g of a trifunctional polyether of 27.5% by weight of propylene oxide and 72.5% by weight of ethylene oxide (OH number 36) prepared according to Example 1 were reacted with 150 g of an isomeric mixture of 2,4/2,6-toluylene diisocyanate (80:20) as described in Example 1 and blocked with 102 g of butanone oxime. Isocyanate content: 5.5%, viscosity: 45,000 mPa.s/25° C.

1000 g of this hydrophilic, blocked isocyanate prepolymer were mixed with 155 g of 4,4'-diamino-3,3'-dimethyldicyclohexylmethane dissolved in 150 g of methoxypropyl acetate. Cross-linking in the coating channel at 150°–160° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat hardenable coating composition, which cures to form a coating having a permeability to water vapor of about 2 to 8 g/cm$^2$ h according to IUP 15, comprising
    (A) a prepolymer containing an average of 2–4 ketoxime-blocked isocyanate groups, having an average molecular weight of about 500 to 15,000 and based on an aromatic polyisocyanate and a polyhydroxyl component containing about 20 to 100% by weight of ethylene oxide and
    (B) a cross-linking agent corresponding to the formula

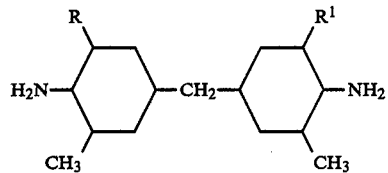

wherein R and R$^1$ represent H or a C$_1$–C$_4$-alkyl group and wherein the equivalent ratio of blocked isocyanate groups in (A) to NH$_2$ groups in (B) is about 1.35:1 to 0.95:1.

2. The composition of claim 1 wherein said cross-linking agent comprises diamino-3,3'-dimethyldicyclo-hexylmethane.

3. The composition of claim 1 wherein said polyhydroxyl component contains about 40 to 80% by weight of ethylene oxide.

4. The composition of claim 2 wherein said polyhydroxyl component contains about 40 to 80% by weight of ethylene oxide.

5. The composition of claim 1 wherein said composition has a solids content of about 35 to 100% by weight.

6. The composition of claim 1 wherein said polyhydroxyl component comprises a mixture of a polyhydroxy polyether and a polyhydroxy polyester.

7. The composition of claim 6 wherein said mixture has a polyether content of about 30 to 99% by weight.

8. The composition of claim 1 wherein said composition additionally comprises an aliphatic and/or aromatic polyurethane solution.

9. A coated substrate which has been coated with the composition of Example 1.

10. The coated substrate of claim 9 wherein said substrate is a textile.

* * * * *